United States Patent [19]
Takamiya et al.

[11] Patent Number: 4,682,509
[45] Date of Patent: Jul. 28, 1987

[54] ADJUSTABLE HANDLEBAR FOR BICYCLE

[75] Inventors: Kikuzo Takamiya, Kitamoto; Hideyuki Ishibashi, Ageo, both of Japan

[73] Assignee: Bridgestone Cycle Co., Ltd., Tokyo, Japan

[21] Appl. No.: 742,224

[22] Filed: Jun. 6, 1985

Related U.S. Application Data

[62] Division of Ser. No. 486,869, Apr. 20, 1983, abandoned.

[30] Foreign Application Priority Data

Apr. 22, 1982 [JP] Japan .................................. 58-66356
Apr. 22, 1982 [JP] Japan .................................. 58-66357
May 27, 1982 [JP] Japan .................................. 58-88771
Mar. 2, 1983 [JP] Japan .................................. 59-32923

[51] Int. Cl.$^4$ ............................................. B62K 21/16
[52] U.S. Cl. .................. 74/551.4; 74/551.5; 403/97
[58] Field of Search ............... 74/551.5, 551.4, 551.3, 74/551.7, 551.8, 551.1; 403/323, 97, 93, 94, 374, 96, 330; 292/57; 280/278, 287, 271

[56] References Cited

U.S. PATENT DOCUMENTS

| 555,150 | 2/1896 | Dieterich et al. ................. | 74/551.1 |
| 583,105 | 5/1897 | Wheeler . | |
| 586,162 | 7/1897 | Cobb ................................. | 74/551.5 |
| 588,242 | 8/1897 | Rexroth ............................ | 74/551.5 |
| 593,367 | 11/1897 | Wheeler . | |
| 635,689 | 10/1899 | King et al. ........................ | 74/551.5 |
| 677,373 | 7/1901 | Rauhoff ............................ | 74/551.5 |
| 677,428 | 7/1901 | Spencer ............................ | 74/551.5 |
| 698,137 | 4/1902 | Porter ............................... | 74/551.5 |
| 774,421 | 11/1904 | Griswold .......................... | 74/551.5 |
| 781,128 | 1/1905 | Calkins ............................. | 74/551.4 |
| 943,573 | 12/1909 | Simon .............................. | 74/551.1 |
| 1,934,910 | 12/1932 | Buhr . | |
| 3,848,784 | 11/1974 | Shimano et al. . | |
| 4,111,447 | 9/1978 | Ishida . | |

FOREIGN PATENT DOCUMENTS

| 356924 | 8/1905 | France ............................. | 74/551.5 |
| 677744 | 3/1930 | France ............................. | 74/551.5 |
| 733226 | 3/1932 | France ............................. | 74/551.5 |
| 411907 | 7/1945 | Italy ................................. | 74/551.5 |
| 4718728 | 5/1968 | Japan . | |
| 48-25544 | 7/1973 | Japan . | |
| 395697 | 7/1933 | United Kingdom ............... | 74/551.3 |

Primary Examiner—Gary L. Smith
Assistant Examiner—Rodney M. Lindsey
Attorney, Agent, or Firm—Parkhurst & Oliff

[57] ABSTRACT

An adjustable handlebar for a bicycle according to the invention comprises two handlebar members whose adjacent ends are pivotally supported by two bolts whose extended axes are crossing in front of the bicycle, gear teeth formed in the adjacent ends of the handlebar members so as to pivotally move one handlebar member by pivotally moving the other handlebar member, two sets of isosceles triangle-shaped thrust serrations at adjacent ends of the handlebar members and an upper portion of a handlebar stem, thereby anchoring the handlebar members when the bolts are tightened and moving the adjacent ends of the handlebar members away from the upper portion of the handlebar stem when the bolts are loosened and the handlebar members are rotated, and a cam and cam follower assembly having a lever for engaging and disengaging the serrations, thereby simply changing positions of handlebar members symmetrically. The upper portion of the handlebar stem is formed by a rear part and a front part pivotally movable relative to the rear part in a substantially vertical direction about a substantially horizontal axis in transverse direction of the bicycle and clamped to the rear part by the clamping means, thereby enabling inclined angles of grips of the handlebar to be changed.

8 Claims, 33 Drawing Figures

FIG_1

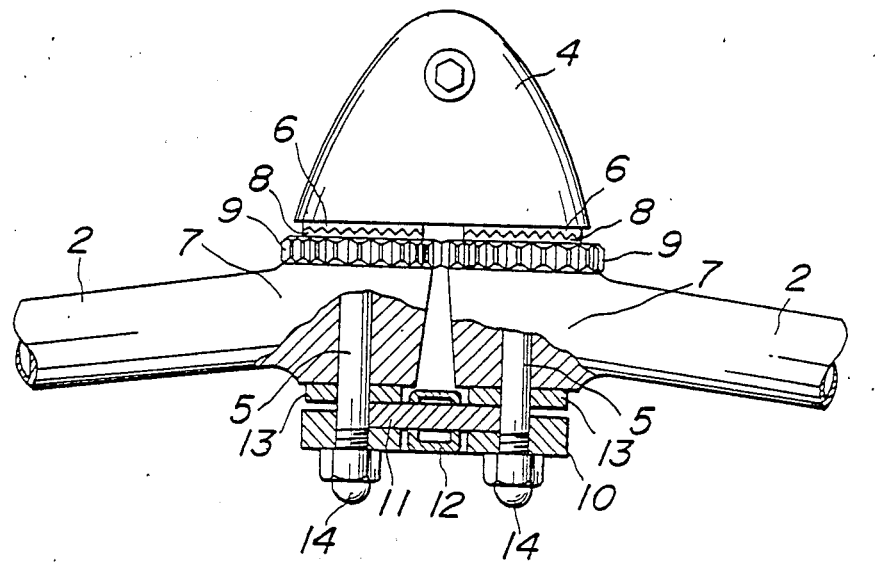
FIG_4
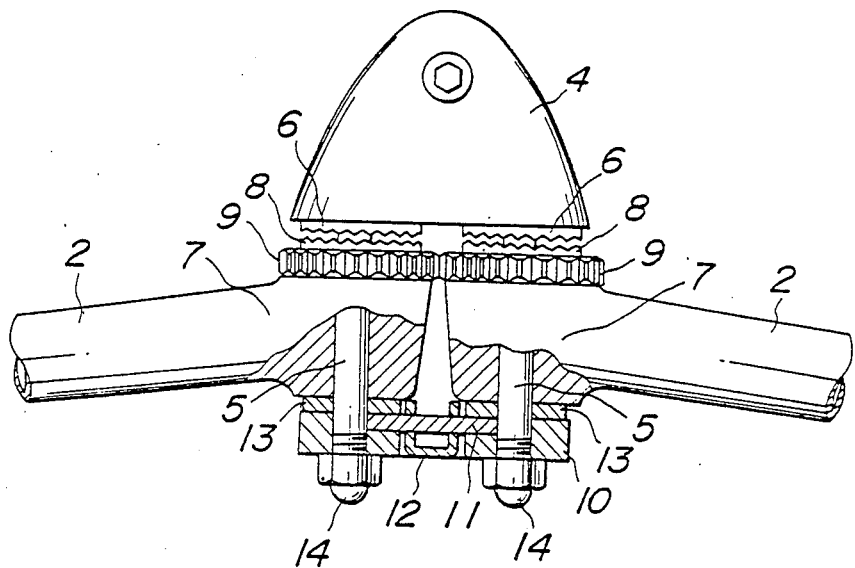
FIG_5

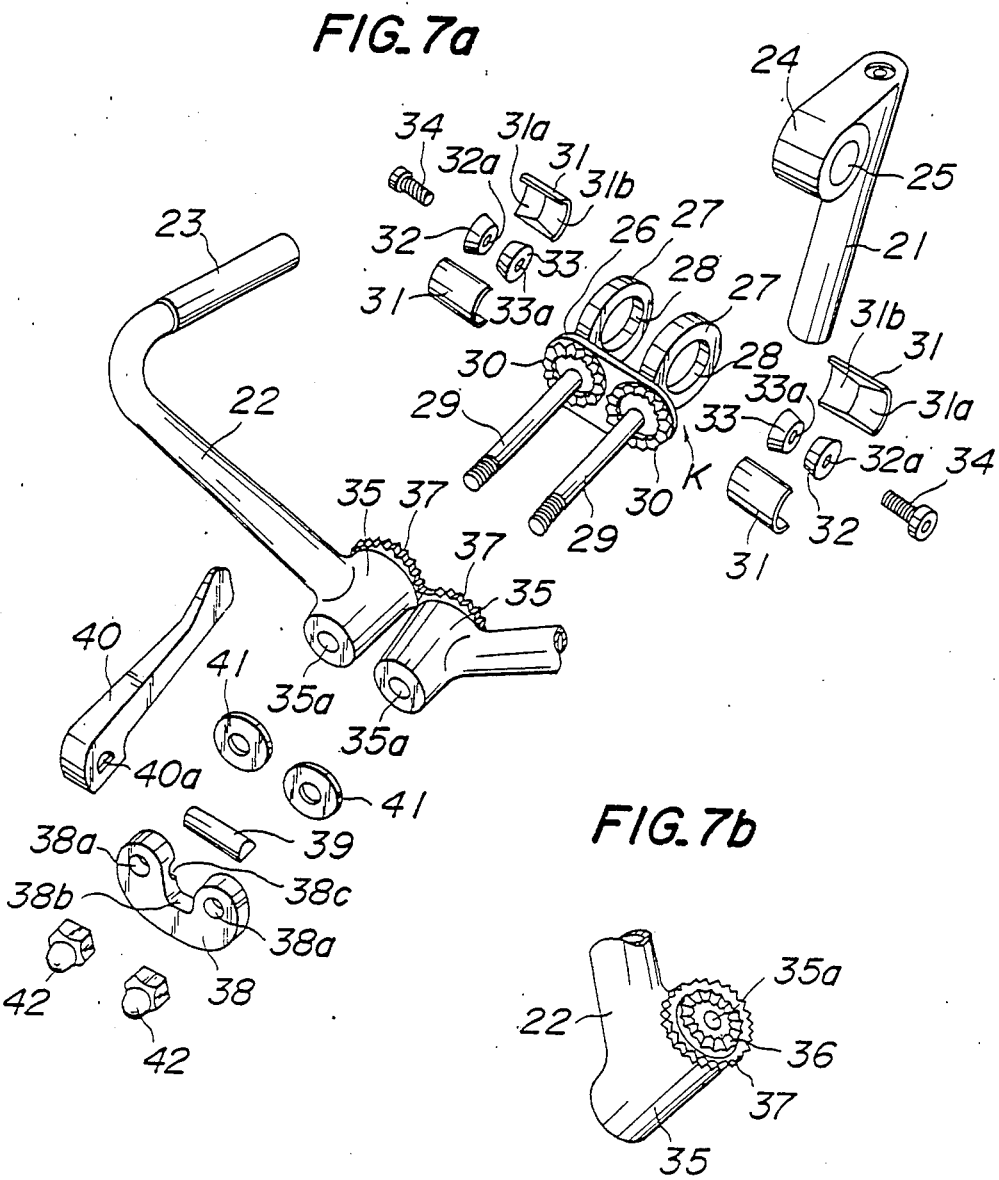

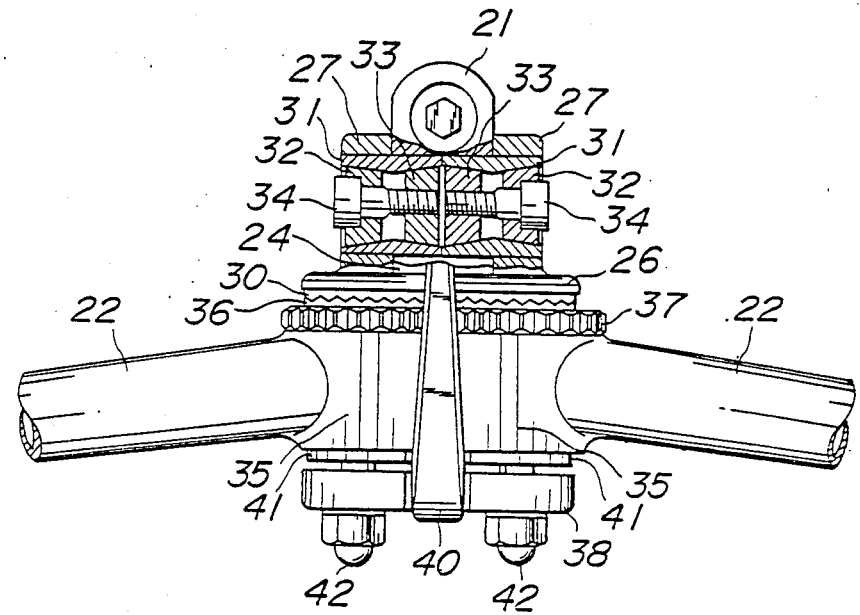
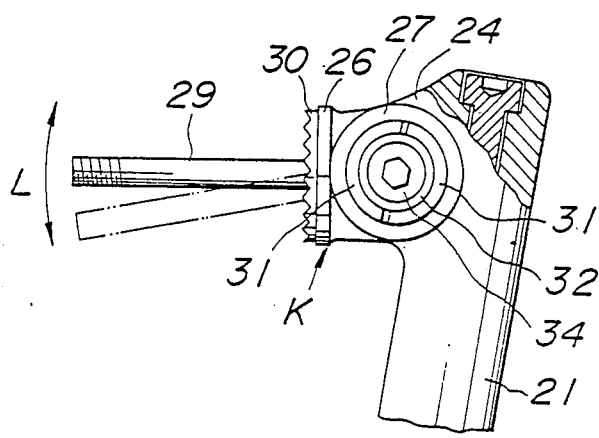

FIG_18a
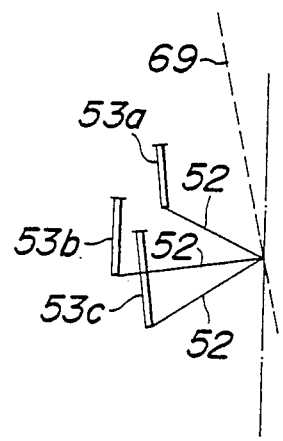
FIG_18b
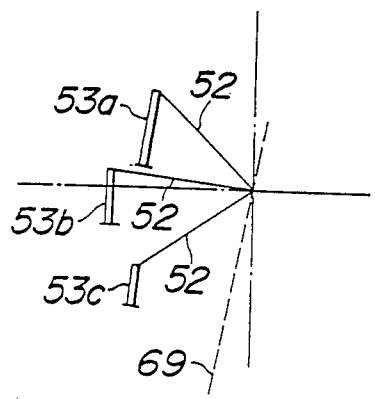
FIG_18c
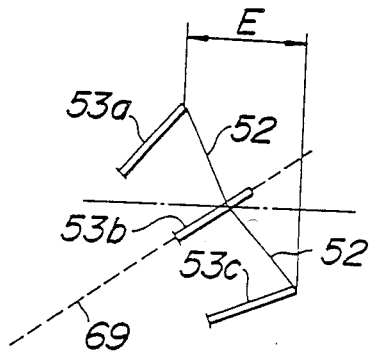

ADJUSTABLE HANDLEBAR FOR BICYCLE

This is a division of application Ser. No. 486,869 filed Apr. 20, 1983 now abandoned.

BACKGROUND OF THE INVENTION

1. Field of the Invention

This invention relates to an adjustable handlebar for a bicycle, whose handlebar members are pivotally movable about their adjacent ends and securely fixed and more particularly to an adjustable handlebar for a bicycle having handlebar grips whose inclined angles are adjustable.

2. Description of the Prior Art

There have been suggested many adjustable handlebars for bicycles, whose handlebar grips are vertically adjustable. For example, Japanese Utility Model Application Publication No. 18,728/72 discloses a handlebar, wherein after a lock nut and a clamp nut have been loosened, a right and a left handlebar member are separately pivotally moved into desired positions and after their symmetry has been ascertained, the clamp nut and lock nut are again tightened. Japanese Patent Application Publication No. 25,544/73 discloses a handlebar capable of adjusting heights of handlebar grips simultaneously. In adjusting the handlebar disclosed in this publication, it is however required to remove and again assemble four nuts, three washers, a jaw washer and a jaw washer support assembly consisting of a washer, a pivot shaft, a spring and an operating lever. These handlebars disclosed in these publications are complicated in construction and troublesome to handle and tend in use to cause loosening of the handlebars unacceptable for bicycle riding unless various screw-threaded members are fixedly tightened. Therefore, these handlebars have not been practically used yet.

In general, ideal positions and angles of handlebar grips of bicycles are different depending upon uses of the bicycles. For example, when a cyclist is riding a bicycle at a high speed as for sports, the upper half of his body is forwardly inclined as shown in solid lines A in FIG. 1. It is preferable to arrange grips of a handlebar in a lowered and forwardly shifted position B whose angle of elevation is small or near a horizontal as shown in a dot-and-dash line C. On the other hand, he assumes a comfortable position D shown in two dots-and-dash lines with the upper part of his body being upright when riding at usual or lower speeds. It is preferable in this case to arrange the grips in a raised position B' retracted by E, whose angle of elevation is comparatively large to reduce loads acting upon his wrists.

A handlebar for a bicycle fulfils such requirements has been expected in this technical field for long years.

SUMMARY OF THE INVENTION

It is a primary object of the invention to provide an improved handlebar for a bicycle which solves the above problems of the prior art and which is capable of simply changing positions of handlebar members symmetrically by raising or lowering only one of the handlebar members and securely clamping the adjusted handlebar members thereat.

In order to accomplish the object, an adjustable handlebar for a bicycle according to the invention comprises two handlebar members whose adjacent ends are pivotally supported by two studs extending from an upper portion of a handlebar stem, gear teeth formed on said adjacent ends of the handlebar members and in mesh with each other such that when one of said handlebar members is pivotally moved about said stud, the other handlebar member is also pivotally moved about the other stud, anchoring means provided between engagement surfaces of said upper portion of said handlebar stem and of said adjacent ends of said handlebar members for anchoring said handlebar members, and a cam and cam follower assembly having a lever for engaging and disengaging said anchoring means.

It is another object of the invention to provide a handlebar for a bicycle which is capable not only changing positions of handlebar members but also freely changing inclined angles of grips in the front and rear direction, thereby enabling the handlebar to be easily changed into lowered, raised or horizontal position and with the most convenient grip angles for riding and braking operation according to a physique of a cyclist.

For the above object, with the handlebar according to the invention, said upper portion of the handlebar stem is formed by a rear part and a front part pivotally movable relative to said rear part about a substantially horizontal axis in a transverse direction of the bicycle and clamped to said rear part by clamping means and said two studs extend from said front part, thereby enabling inclined angles of grips of the handlebar to be changed.

In a preferred embodiment of the invention, said studs are arranged so that extensions of axes of said studs are crossing in front of the bicycle.

In a more preferred embodiment of the invention, said adjacent ends of said two handlebar members are formed with spaces about said studs extending therethrough, in which sapce are provided coil springs about said studs to urge said adjacent ends of the handlebar members away from said upper portion of said handlebar stem, whereby positively disengaging said anchoring means when said studs are loosened.

In an other preferred embodiment of the invention, said cam and cam follower assembly comprises a cam holder adjacent to and in front of said adjacent ends of said handlebar members, a retainer plate adjacent to and in front of said cam holder to form in their adjacent portions a cam fitting cylindrical space, said studs passing through said cam holder and said retainer plate so as to permit said holder and plate to slide thereon when the bolts are loosened, and a cam lever formed at one end with ellipsoid-shaped cams extending in lateral directions and received in said cam fitting cylindrical space to move said cam holder away from said retainer plate when said ellipsoid-shaped cams are rotated in said cylindrical space by moving said cam lever.

In order that the invention may be more clearly understood, preferred embodiments will be described, by way of example, with reference to the accompanying drawings.

BRIEF DESCRIPTION OF THE DRAWINGS

FIG. 3b is a perspective view showing a part of the handlebar shown in FIG. 3a;

FIG. 4 is a partially sectional view of a part of the handlebar shown in FIG. 2, illustrating serrations engaged with each other;

FIG. 5 is a partially sectional view of the part of the handlebar similar to FIG. 4, illustrating the disengaged serrations;

FIG. 7a is an exploded perspective view of the handlebar shown in FIG. 6;

FIG. 7b is a perspective view showing a part of the handlebar shown in FIG. 7a;

FIG. 8 is a partial sectional view of a part of the handlebar illustrated in FIG. 6 for explaining the change of grip angles;

FIG. 9 is a partially sectional side view of a part of the handlebar shown in FIG. 8;

FIGS. 18a, 18b and 18c illustrate grip positions of the handlebar of the third embodiment of the invention shown in FIG. 13;

DETAILED DESCRIPTION OF THE PREFERRED EMBODIMENT

Figure 2:
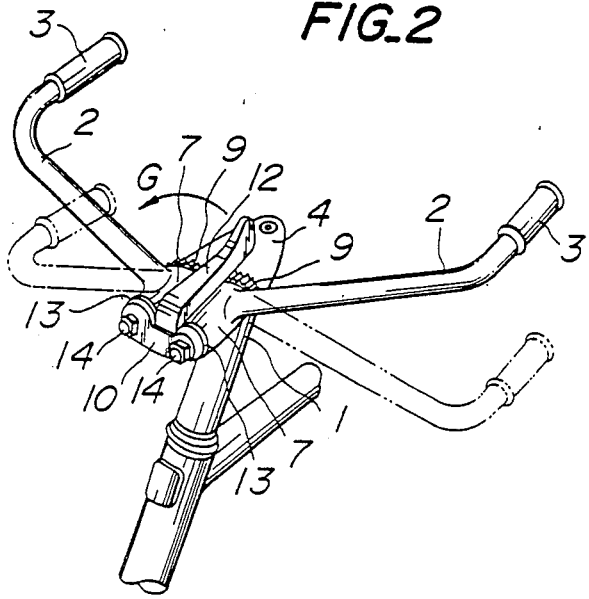
FIG. 2 is a perspective view illustrating one preferred embodiment of an adjustable handlebar for a bicycle according to the invention.

FIG. 2 illustrates a first preferred embodiment of the invention, wherein a handlebar comprises two handlebar members 2 mounted on a handlebar stem or post 1 and handlebar grips 3 fitted on free ends of the respective handlebar members 2.

In this specification and claims, the words "front" and "rear" mean the front and rear sides as viewed from a cyclist riding on a bicycle.

Figure 3A:
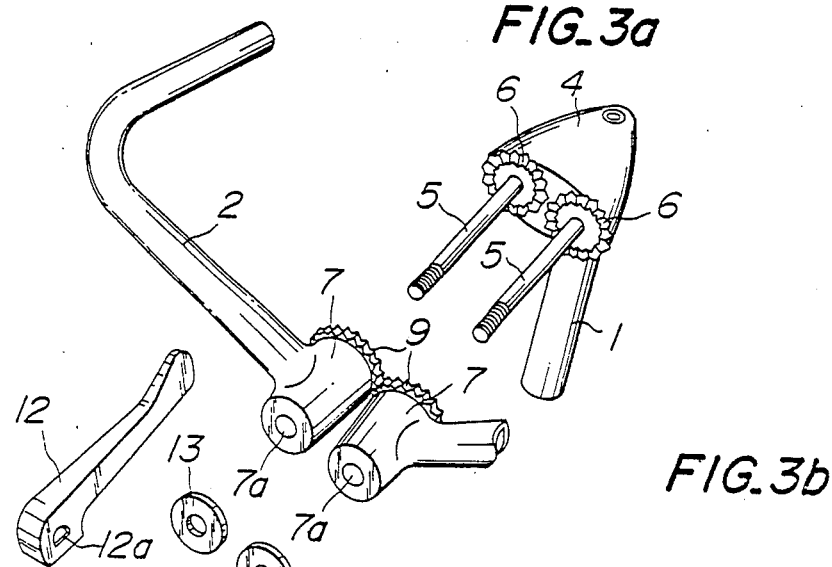
FIG. 3a is an exploded perspective view of the handlebar shown in FIG. 2.
Figure 3B:
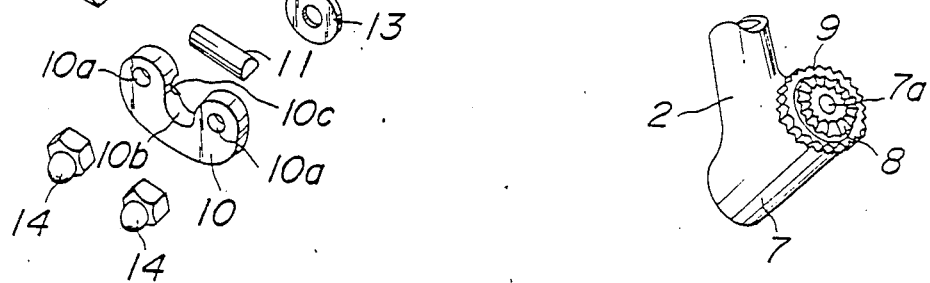

According to this embodiment, a handlebar support member 4 is integrally fixed to an upper end of the handlebar stem 1 and is provided with two screw-threaded studs 5 in parallel with and spaced apart a suitable distance with each other securely fitted in a front surface of the support member 4. Thrust serrations 6 having radial crests, isosceles triangle-shaped in section are provided concentrically to the studs 5 on the front surface of the support member 4. Each handlebar member 2 is formed at the other end adjacent to the handlebar stem 1 with a boss 7 adapted to fit therein the stud 5. The boss 7 is provided on its rear end with thrust serrations 8 (FIG. 3b) adapted to be in mesh with the thrust serrations 6 and is integrally formed on a circumference of the rear end with teeth 9 which are in mesh with teeth 9 of the boss 7 of the other handlebar member 2 when both the studs 5 are fitted in apertures 7a of the bosses 7.

A retainer plate 10 is formed on both sides with holes 10a for receiving the studs 5 and in its upper mid portion with a notch 10b and is further formed in its rear surface with cam fitting grooves 10c on both sides of the notch 10b. An elongated cam 11 having a semicircular cross-section passes through and is fitted in a cam receiving hole 12a in a bottom of a lever 12 to form a unitary part. Flat washers 13 are fitted on front ends of the studs 5 extending from the bosses 7 and the retainer plate 10 is further fitted on the front ends of the studs 5 so as to interpose the cam 11 integrally fitted in the lever 12 and snugly fit in the cam fitting grooves 10c of the retainer plate 10 between the washers 13 and the retainer plate 10 and is fixed thereat by means of nuts 14 threadedly engaged on the ends of the studs 5.

FIGS. 2 and 4 illustrate the handlebar fixed by depressing the lever 12. In this case, the cam 11 is urging the bosses 7 through the flat washers 13 against the handlebar support member 4, so that the thrust serrations 6 and 8 are completely in mesh with each other to securely fix the handlebar members 2 against rotation relative to the studs 5 and against movement in front and rear directions. Moreover, the clamping degree of the handlebar members 2 is adjustable depending upon the tightening degree of the nuts 14.

When it is desired to change the position of the handlebar members 2, the lever 12 is rotated or raised in a direction of an arrow G shown in FIG. 2. As the result, the cam 11 together with the lever 12 is rotated from a position shown in FIG. 4 to that shown in FIG. 5. In other words, the cam 11 is retracted. Under such a condition, therefore, by pivotally moving the handlebar members 2 about the respective studs 5 in an upward or downward direction, the isosceles triangular cross-sectional teeth of the serrations 6 and 8 slide with each other to cause the bosses 7 of the handlebar members 2 to slide along the studs away from the support member 4, with the result that the serrations 6 and 8 are disengaged from each other. As the gears 9 integral with the respective bosses 7 are engaged with each other, operation of one of the handlebar members 2 causes the other to be operated. Accordingly, all that is required is to operate one of the handlebar members. When the handlebar members assume a desired position, the lever 12 is depressed to the original position to rotate the cam 11 into the position shown in FIG. 4, thereby enabling the handlebar members 2 to be securely fixed.

As above described, the handlebar according to the invention is simple in construction and hence easy to manufacture. The change of the handlebar position is very simply and quickly carried out only by raising or lowering the single lever and moving one of the handlebar members. By depressing the lever the handlebar is securely fixed against rotation and axial movement relative to the studs to improve the safety of bicycle riding.

FIGS. 6-11 illustrate a second embodiment of the invention, wherein a handlebar comprises two handlebar members 22 mounted on a handlebar stem or post 21 and handlebar grips 23 fitted on free ends of the respective handlebar members 22.

According to this embodiment, a bracket 24 on an upper end of the handlebar stem 21 extends in a front direction of a bicycle. The bracket 24 has a front end formed like a boss formed with a horizontal hole 25 traversely passing therethrough. An ellipse-shaped base or disc 26 is provided on its rear surface with two brackets 27 adapted to embrace the boss of the bracket 24 and having apertures 28 in alignment with the horizontal hole 25 to form an integral handlebar support member K. The base 26 of the support member K is provided with two screw-threaded studs 29 in parallel with and spaced apart a suitable distance with each other securely fitted in a front surface of the support member K. Thrust serrations 30 having radial crests, isosceles triangle-shaped in section are provided concentrically to the studs 29 on the front surface of the base 6 of the support member K.

When the bracket 24 of the handlebar stem 21 is fitted between the brackets 27 of the handlebar support member K as shown in FIG. 8, sleeve joints 31 longitudinally divided into semicircular sleeve members are inserted in the aligned hole 25 and apertures 28. The sleeve joint 31 is formed with apertures 31a and 31b inwardly tapered from both ends of the joint. A tapered cotter 32 adapted to be fitted in the outer tapered aperture 31a of the sleeve joint 31 is centrally formed with a bolt passing-through aperture 32a and a tapered cotter 33 adapted to be fitted in the inner tapered aperture 31b of the sleeve joint 31 is centrally formed with a screw-threaded aperture 33a. When the sleeve joints 31 are incorporated in the brackets 24 and 27, bolts 34 extend through the apertures 32a of the outer tapered cotters 32 and are threadedly engaged in the threaded apertures 33a of the inner tapered cotters 33 as shown in FIG. 8.

With this arrangement, when the bolts 34 are loosened, the sleeve joints 31 as horizontal shafts reduce their outer diameters, permitting handle support member K to be rotated relative to the handlebar stem 21 as shown in a double-headed arrow L in FIG. 9. When the bolts 34 are tightened to move the tapered cotters 12 and 13 toward each other, the wedge action of the cotters forces the outer diameters of the sleeve joints to expand, thereby enabling the handlebar support member K to be clamped at its position relative to the handlebar stem 21.

Although the two sets of sleeve joints have been provided in this embodiment, one of sleeve joint of two semicircular sleeve members may be provided in stead of the two sets of the sleeve joints.

One example of an arrangement of the handlebar support member K pivotally supporting the handlebar members 22 adapted to be clamped at any position and whose grips 23 are vertically movable will be explained hereinafter. Each handlebar member 22 is formed at the end adjacent to the handlebar stem 21 with a boss 35 adapted to fit therein the stud 29. The boss 35 is provided on its rear end with thrust serrations 36 (FIG. 7b) adapted to be in mesh with the thrust serrations 30 and is integrally formed on a circumference of the rear end with teeth 37 which are in mesh with teeth 37 of the boss 35 of the other handlebar member 22 when both the studs 29 are fitted in apertures 15a of the bosses 15.

A retainer plate 38 is formed on both sides with holes 38a for receiving the studs 29 and in its upper mid portion with a notch 38b and is further formed in its rear surface with cam fitting grooves 38c on both sides of the notch 38b. An elongated cam 39 having a semicircular crosssection passes through and is fitted in a cam receiving hole 20a in a bottom of a lever 40 to form a unitary part. Flat washers 41 are fitted on front ends of the studs 29 extending from the bosses 35 and the retainer plate 38 is further fitted on the front ends of the studs 29 so as to interpose the cam 39 integrally fitted in the lever 40 and snugly fit in the cam fitting grooves 38c of the retainer plate 38 between the washers 41 and the retainer plate 38 and is fixed thereat by means of nuts 42 threadedly engaged on the ends of the sutds 29.

Figure 6:
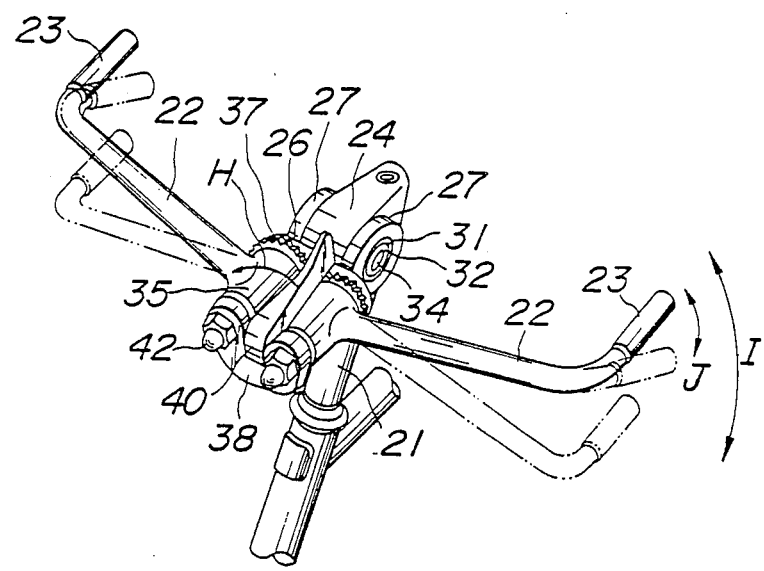
FIG. 6 is a perspective view of a second embodiment of the adjustable handlebar according to the invention.
Figure 10:
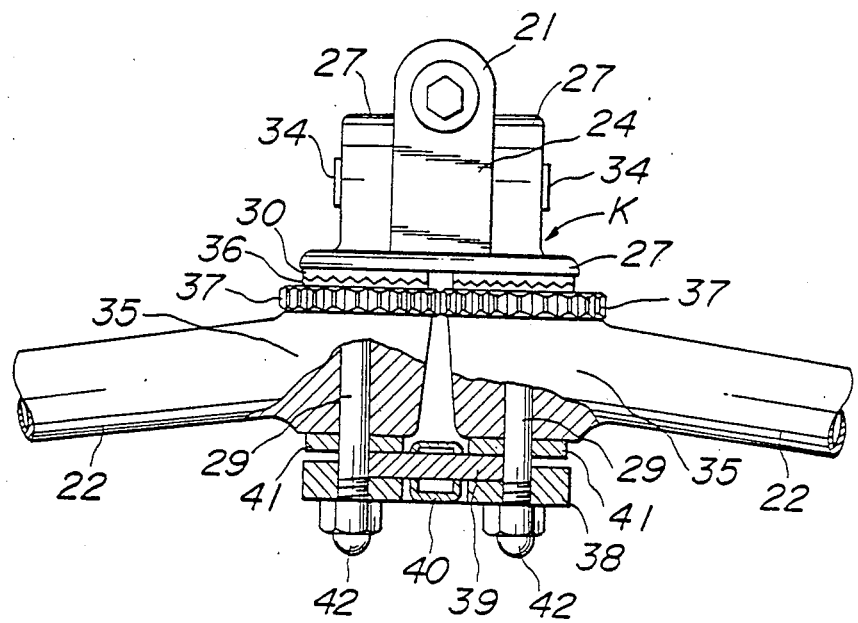
FIG. 10 is a partially sectional view of a part of the handlebar illustrated in FIG. 6, illustrating serrations engaged with each other.
Figure 11:
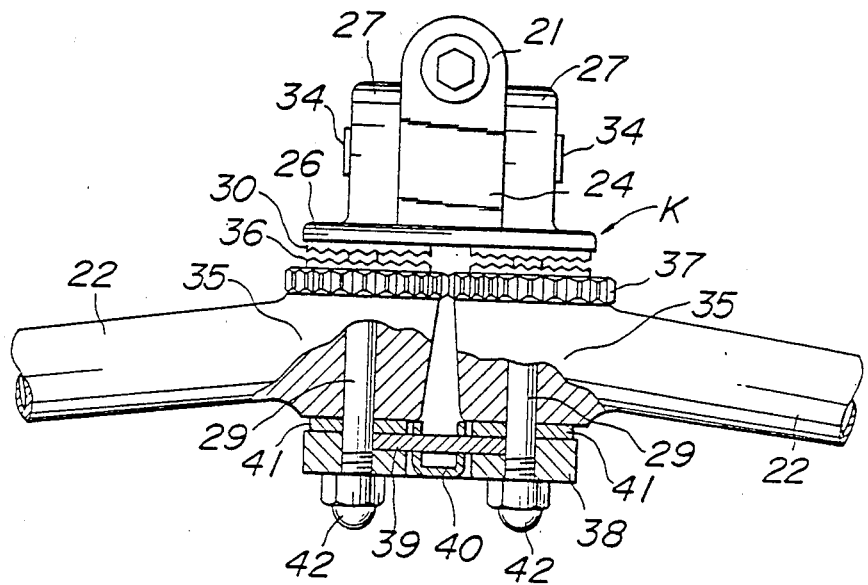
FIG. 11 is a partially sectional view of the part of the handlebar similar to FIG. 10, illustrating the disengaged serrations.

FIGS. 6 and 10 illustrate the handlebar fixed by depressing the lever 40. In this case, the cam 39 is urging the bosses 35 through the flat washers 41 against the handlebar support member K, so that the thrust serrations 30 and 36 are completely in mesh with each other to securely fix the handlebar members 22 against rotation relative to the studs 29 and against movement in front and rear directions. Moreover the clamping degree of the handlebar members 22 is adjustable depending upon the tightening degree of the nuts 42.

When it is desired to change the position of the handlebar members 22, the lever 40 is rotated or raised in a direction of an arrow H shown in FIG. 6. As the result, the cam 39 together with the lever 40 is rotated from a position shown in FIG. 10 to that shown in FIG. 11. In other words, the cam 39 is retracted. Under such a condition, therefore, by pivotally moving the handlebar members 22 about the respective studs 29 in an upward or downward direction, the isosceles triangular cross-sectional teeth of the serrations 30 and 36 slide with each other to cause the bosses 35 of the handlebar members 22 to slide along the studs away from the support member K, with the result that the serrations 30 and 36 are disengaged from each other. As the gears 37 integral with the respective bosses 35 are engaged with each other, operation of one of the handlebar members 22 causes the other to be operated. Accordingly, all that is required is to operate one of the handlebar members. When the handlebar members assume a desired position, the lever 40 is depressed to the original position to rotate the cam 39 into the position shown in FIG. 10, thereby enabling the handlebar members 22 to be securely fixed.

With the above arrangement, it is quite the same as in the first embodiment that when it is desired to move the grips 23 of the handlebar members 22 upwardly or downwardly, the change of the handlebar position is very simply and quickly effected only by raising or lowering the single lever and moving one of the handlebar members 22. Moreover, by depressing the lever 40 the handlebar is securely fixed against rotation and axial movement relative to the studs 29 to improve the safety of bicycle riding.

Furthermore, upon loosening the bolts 34 for connecting the handlebar stem 21 with the handlebar support member K, the handlebar members 22 are rotated in the direction of the double-headed arrows J and L in FIGS. 6 and 9 to change the inclined angles of the grips 23 about the boss 24 at will and are securely clamped thereat by tightening the bolts 34. According to the embodiment, therefore, one bicycle is capable of simply changing its handlebar into lowered, raised or horizontal position and easily and securely setting the grip angles which are the most convenient for riding and braking operation according to a physique of a cyclist.

Figure 12A:
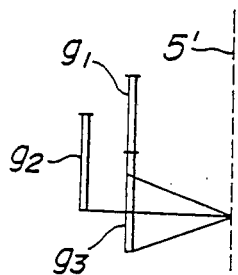
FIGS. 12a, 12b and 12c illustrate grip positions of the handlebar of the first embodiment of the invention which assumes various positions.
Figure 12B:
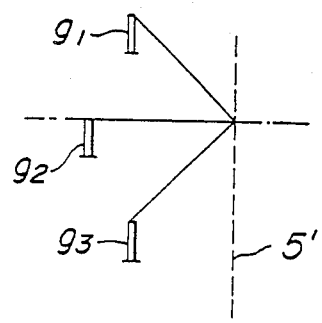
Figure 12C:
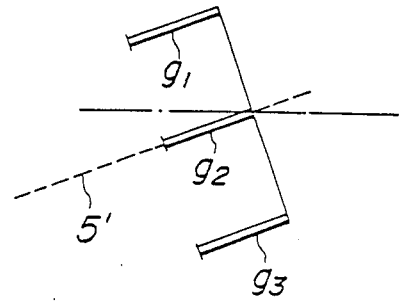
Figure 13:
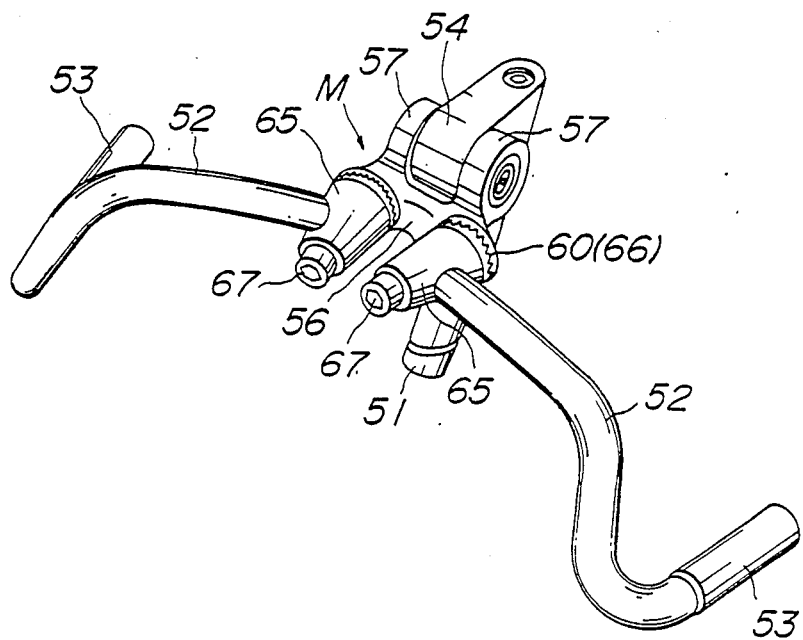
FIG. 13 is a perspective view of a third embodiment of the adjustable handlebar according to the invention.
Figure 14:
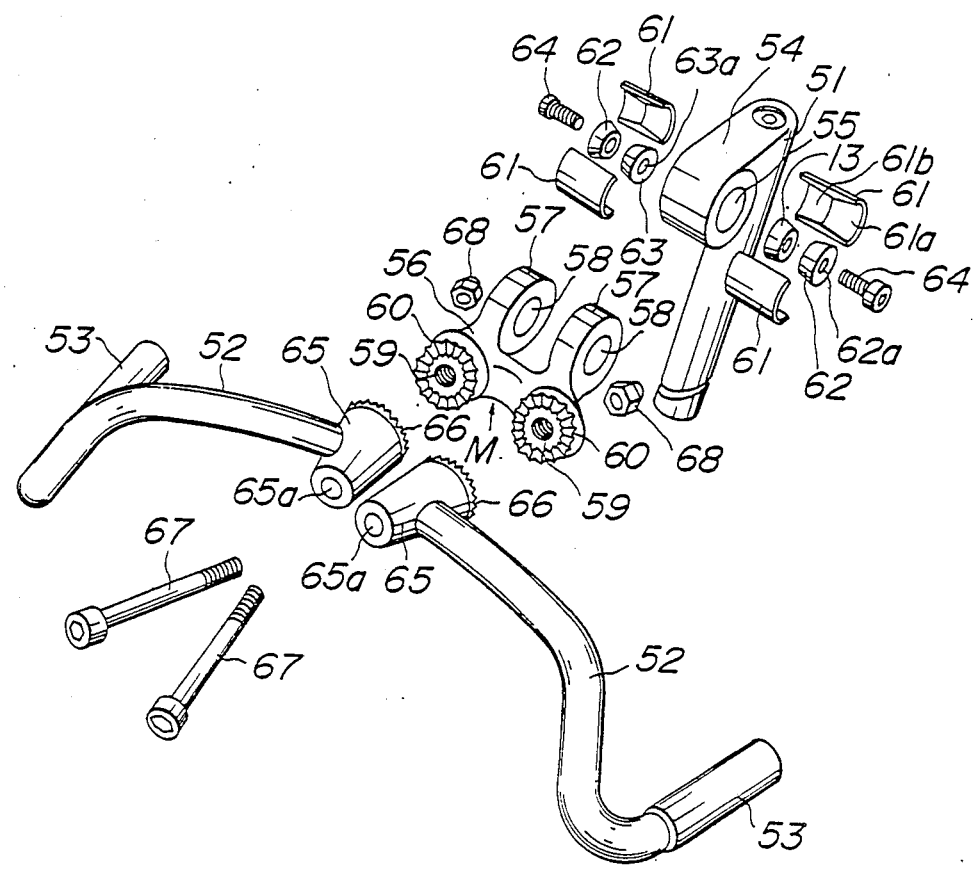
FIG. 14 is an exploded perspective view of the handlebar shown in FIG. 13.
Figure 15:
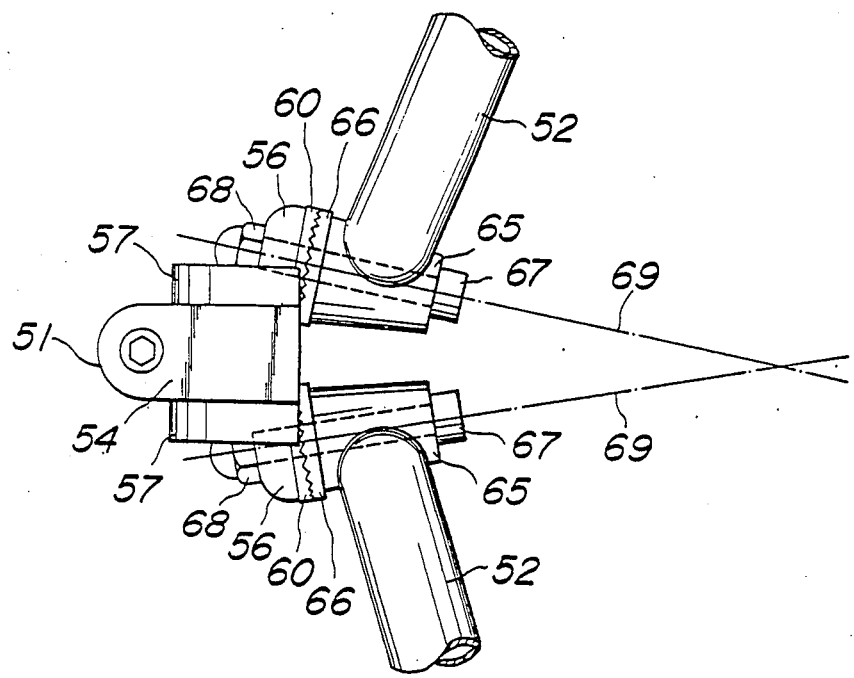
FIG. 15 is a plan view of a part of the handlebar shown in FIG. 13.

Referring back to FIG. 2 illustrating the first embodiment of the invention, the handlebar members 2 with the grips 3 are pivotally movable about parallel axes of the studs 5. FIGS. 12a-12c illustrate positions $g_1$, $g_2$ and $g_3$ of the grips 3 of the handlebar 2 in raised, horizontal and lowered positions, where dash lines 5' denote axis of the stud 5. FIGS. 12a, 12b and 12c show the positions of the grip as viewed from above, front and side positions of the bicycle, respectively.

Figure 1:
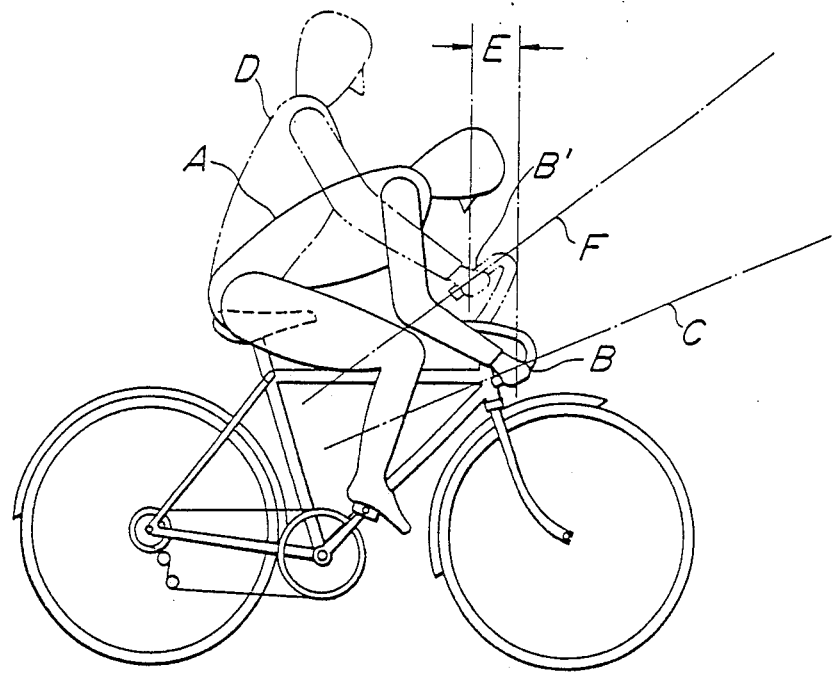
FIG. 1 is an explanatory view illustrating ideal positions of a handlebar and grip angles for a bicycle.

As can be seen from FIG. 12c, with the handlebar pivotally mounted by such parallel studs 5, an angle of elevation of the grips even in the raised position $g_1$ is not large and an angle of elevation of the grips even in the lowered position $g_3$ is not small, so that the desired grip angles as shown in FIG. 1 cannot be obtained. As can be seen from FIG. 12a, moreover, when the handlebar members 2 are in the raised or lowered position, the distance between the grips 3 is smaller than that in the horizontal position. It is desired for the grips in the raised and lowered positions to be rearwardly outwardly diverging. The following third embodiment of the invention solves these problems.

FIGS. 13-17 illustrate the third embodiment of the invention, wherein a handlebar comprises two handlebar members 52 mounted on a handlebar stem or post 51 and handlebar grips 53 fitted on free ends of the respective handlebar members 52.

According to this embodiment, a bracket 54 on an upper end of the handlebar stem 51 extends in a front direction of a bicycle. The bracket 54 has a front end formed like a boss formed with a horizontal hole 55 traversely passing therethrough. An ellipse-shaped base 56 is provided on its rear surface with two brackets 57 adapted to embrace the boss of the bracket 54 and having apertures 58 in alignment with the horizontal hole 55 to form an integral handlebar support member M. The base 56 of the support member M is formed with two stud screwed apertures 59 spaced apart a suitable distance with each other in a front surface of the support member M. Thrust serrations 60 having radial crests, isosceles triangle-shaped in section are provided concentrically to the apertures 59 on the front surface of the base 56 of the support member M.

Figure 17:
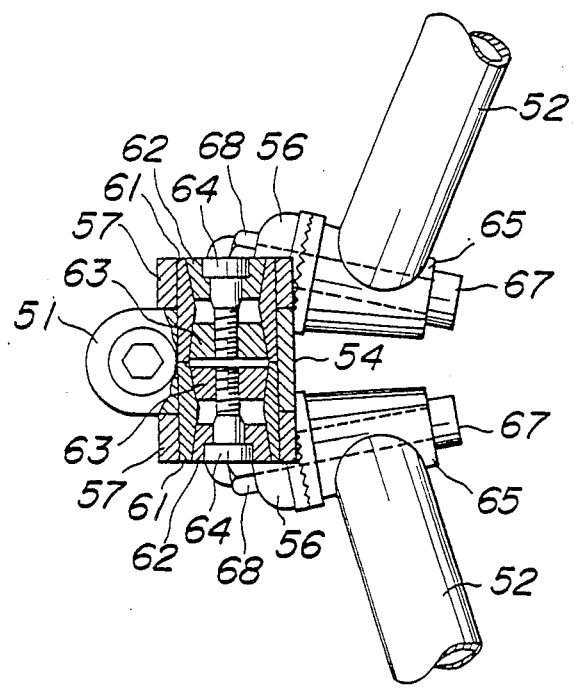
FIG. 17 is a partially sectional plan view of the part of the handlebar shown in FIG. 15.

When the bracket 54 of the handlebar stem 51 is fitted between the brackets 57 of the handlebar support member M as shown in FIG. 17, sleeve joints 61 longitudinally divided into semicircular sleeve members are inserted in the aligned holes 55 and apertures 58. The sleeve joint 31 is formed with apertures 61a and 61b inwardly tapered from both ends of the joint. A tapered cotter 62 adapted to be fitted in the outer tapered aperture 61a of the sleeve joint 61 is centrally formed with a bolt passing-through aperture 62a and a tapered cotter 63 adapted to be fitted in the inner tapered aperture 61b of the sleeve joint 61 is centrally formed with a screw-threaded aperture 63a. When the sleeve joints 61 are incorporated in the brackets 54 and 57, bolts 64 extend through the apertures 62a of the outer tapered cotters 62 and are threadedly engaged in the threaded apertures 63a of the inner tapered cotters 63 as shown in FIG. 17.

Figure 16:
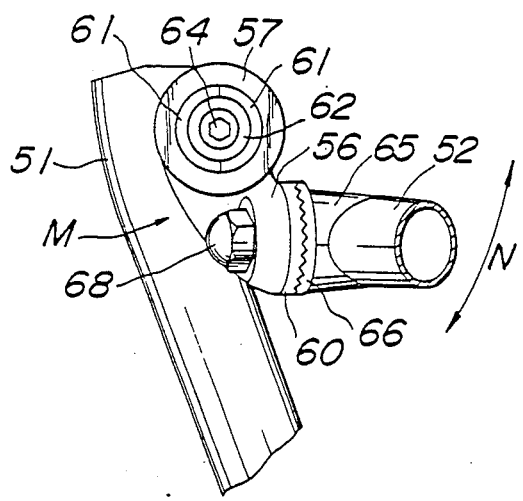
FIG. 16 is a side view of the part of the handlebar shown in FIG. 15.

With this arrangement, when the bolts 64 are loosened, the sleeve joints 61 as horizontal shafts reduce their outer diameters, permitting the handle support member M to be rotated relative to the handlebar stem 51 as shown in a double-headed arrow N in FIG. 16. When the bolts 64 are tightened to move the tapered cotters 62 and 63 toward each other, the wedge action of the cotters forces the outer diameters of the sleeve joints to expand, thereby enabling the handlebar support member M to be clamped at any position relative to the handlebar stem 51.

Although the two sets of sleeve joints have been provided in this embodiment, one of sleeve joint of two semicircular sleeve members may be provided in stead of the two sets of the sleeve joints.

Each handlebar member 52 is formed at the end adjacent to the handlebar stem 51 with a boss 65. The boss 65 is provided on its rear end with thrust serrations 66 adapted to be in mesh with the thrust serrations 60 and is formed with an aperture 65a for a bolt 67 passing therethrough such that axes 69 of the two bolts 67 are crossing in front of the bicycle, when screw-threaded ends of the bolts 67 passing through the apertures 65a of the bosses 65 are screwed into the screw-threaded apertures 59 in the base 56. Nuts 68 as lock nuts are threadedly engaged on the screw-threaded ends of the bolts 67 extending rewardly from the base 56.

With the handlebar constructed according to the third embodiment, when it is desired to change the position of the handlebar members 52, the bolts 67 and the nuts 68 are loosened to bring the thrust serrations 66 of the bosses 65 and the thrust serrations 60 of the handlebar support member M into a disengageable position from each other. Under such a condition, by pivotally moving the handlebar members 52 upwardly or downwardly about the bolts 67, the isosceles triangular cross-sectional teeth of the serrations 60 and 66 slide with each other to cause the bosses 65 of the handlebar members 52 to slide along the bolts 67 away from the support member M, with the result that the thrust serrations 60 and 66 are disengaged from each other. Accordingly, after the handlebar members 52 are bring into desired positions, the bolts 67 and the nuts 68 are tightened to engage the thrust serrations 60 and 66 with each other, thereby enabling the handlebar members to be clamped thereat.

After loosening the bolts 64 for connecting the handlebar stem 51 and support member M, moreover, the handlebar members 52 are rotated in a direction shown by a double-headed arrow N in FIG. 16 to change the inclined angles of the grips 53 in a front and rear direction at will and are thereafter securely clamped thereat by tightening the bolts 64.

FIGS. 18a-18c illustrate positions 53a, 53b and 53c of the grips 53 of the handlebar of the third embodiment of the invention in raised, horizontal and lowered positions, where dash lines 69 denote axis of the bolts 67 crossing with each other. FIGS. 18a, 18b and 18c show the positions of the grip as viewed from above, front and side positions of the bicycle, respectively.

According to the third embodiment of the invention as above described, the axes 69 of the bolts 67 are not in parallel with each other and adapted to cross with each other in front of the bicycle. As can be seen from FIG. 18c, therefore, an angle of elevation of the grip 53a in the raised position is larger than that in the horizontal position and an angle of elevation of the grip 53c in the lowered position is smaller than that in the horizontal position. Such angles are preferable as explained referring to FIG. 1 and the first effect obtained by the third embodiment.

As can be seen from FIG. 18c, moreover, a retracted distance E (also shown in FIG. 1) of the raised grip 53a from the lowered grip 53c in the horizontal direction is larger than that in the event that inclined angles of the grips 53a, 53b and 53c in raised, horizontal and lowered positions are equal to each other as viewed in FIG. 18c, for example, the handlebar members are pivotally mounted by the parallel studs as shown in FIGS. 12a–12c. This is also preferable as explained with FIG. 1 and the second effect of the third embodiment.

As can be seen from FIG. 18a, furthermore, although distances between the grips in the raised and lowered positions are smaller than a distance between the grips in the horizontal position, the grips 53a and 53c in the raised and lowered positions are rewardly outwardly diverging, so that such a divergence of the grips compensates sufficiently the smaller distance between them. This is the third effect of the third embodiment.

In other words, according to the third embodiment, one bicycle is capable of simply changing its handlebar into a lowered, raised or horizontal position and easily and securely setting the grip angles which are the most convenient for riding and braking operation according to a physique of a cyclist.

FIGS. 19–24 illustrate a fourth embodiment of the invention, which has the particular feature of the first embodiment capable of uniformly changing the handlebar positions by the simple operation of vertically moving one of the handlebars and securely clamping the handlebars thereat relative to the handlebar stem and the more particular feature of the third embodiment having the handlebar members being pivotally supported at their inner ends about two axes crossing in front of a bicycle and further comprises lock means for preventing the handlebar members from returning when a lever with a cam is in an engagement position, thereby providing a more improved adjustable handlebar for a bicycle.

Referring to FIGS. 19–24, a handlebar comprises two handlebar members 102 mounted on a handlebar stem or post 101 and handlebar grips 103 fitted on free ends of the respective handlebar members 102.

The handlebar stem 101 is integrally formed on its upper end with a handlebar support member 104 in the form of an elongated ellipse in a front elevation. The support member 104 is formed with screw-threaded apertures 105 whose extended axes are crossing with each other and is formed about the apertures 105 with bosses 106 extending somewhat in a front direction of a bicycle. Each the boss 106 is formed on its circumference with annularly arranged thrust serrations 107 having isosceles triangular cross-sectional radial crests.

Figure 22:
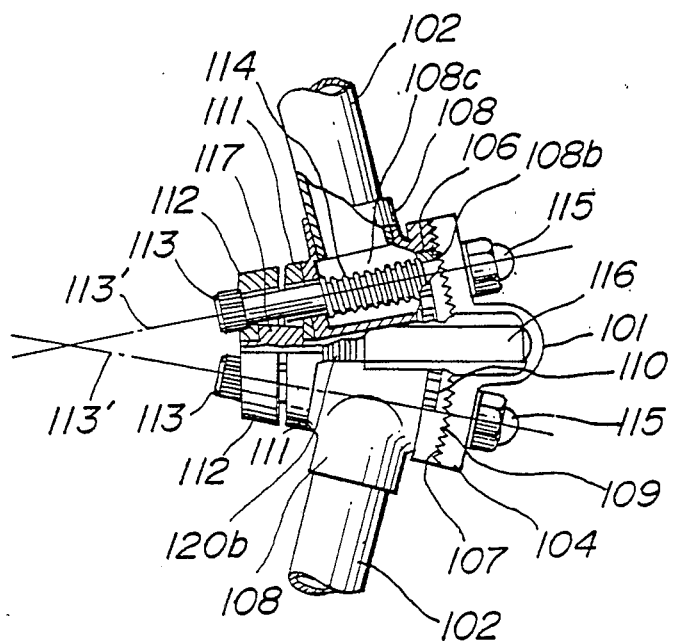
FIG. 22 is a partially sectional plan view of a part of the handlebar shown in FIG. 19.

Each handlebar member 102 is integrally formed at the end adjacent to the handlebar stem 101 with a boss 108. The boss 108 is formed in its front surface with bolt passingthrough apertures 108a and in its rear surface with apertures 108b for receiving the bosses 106 of the support member 104 (FIG. 22). The boss 108 is hollow or includes a cavity between the apertures 108a and 108b. The boss 108 is formed at its rear end with a flange. The flange is provided on its rear surface with thrust serrations 109 adapted to be in mesh with the thrust serrations 107 of the support member 104 and on its outer circumference with gear teeth 110 in mesh with gear teeth 110 provided on an outer circumference of a flange of the other boss 108. It is sufficient to provide the gear teeth 110 extending on an arc corresponding to the rotating range of the handlebar member 102 without extending over a complete circumference of the flange.

A laterally elongated cam holder 111 abuts against the front surfaces of the bosses 108 and is formed in its right and left halves with bolt passing through-apertures 111a having slightly larger diameters than those passing therethrough and in its front surface with a cam fitting groove 111b in the form of a half cylinder. The cam holder 111 is further formed with a notch 111c starting from a center of its upper surface and crossing the cam fitting groove 111b and on upper edges on both sides of the notch 111c with projections 111d extending in the rear direction.

A laterally elongated retainer plate 112 is arranged in front of and in opposition to the cam holder 111 and is formed in its right and left halves with bolt passing through-apertures 112a having slightly larger diameters than those of bolts passing therethrough. The retainer plate 112 is further formed in its rear surface with a cam fitting groove 112b in the form of a half cylinder and a notch 112c starting from a center of its upper surface and crossing the cam fitting groove 112b.

Bolts 113 are extended through the apertures 112a of the retainer plate 112, the apertures 111a of the cam holder 111 and the apertures 108a of the bosses 108 and the extending ends beyond the bosses in the rear direction are fitted thereon with coil springs 114 and threadedly engaged in the screw-threaded apertures 105. Lock nuts 115 are threadedly engaged on screw-threaded ends of the bolts 113 extending beyond the support member 104 in the rear direction to assemble the handlebar.

Figure 21:
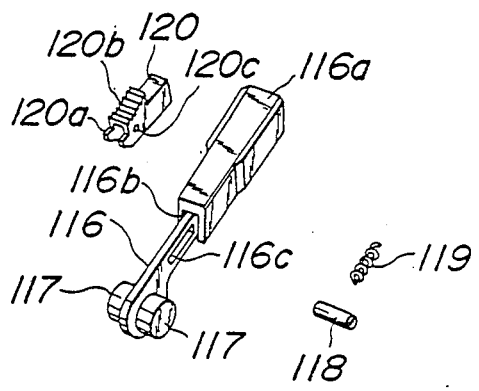
FIG. 21 is an exploded perspective view of a lever lock used in the handlebar shown in FIG. 20.

A cam lever 116 is formed at its bottom with ellipsoid-shaped cams 117 (FIG. 23) extending in lateral directions, respectively and is provided at the other end with a grip 116a. A front portion of the grip 116a forms with a main body of the lever 116 a clearance 116b into which is inserted a rear part of a lever lock later described (FIG. 21). The main body of the lever 116 is formed with a slot 116c through which passes a pin 118 urged in one direction by means of a coil spring 119 having a small outer diameter also accommodated in the slot 116c (FIG. 23).

A lever lock 120 having a U-shaped cross-section is fitted on the main body of the lever 116 embraced by two legs of the U-shaped lever lock 120. The lever lock 120 is formed at its front portion with pawls 120a adapted to engage the projections 111d of the cam holder 111 and on its upper portion with stairs 120b inclined as a whole for operating the lever lock 120 by fingers of a cyclist. The lever lock 120 is formed with an aperture 120c for passing therethrough the pin 118.

Figure 20:
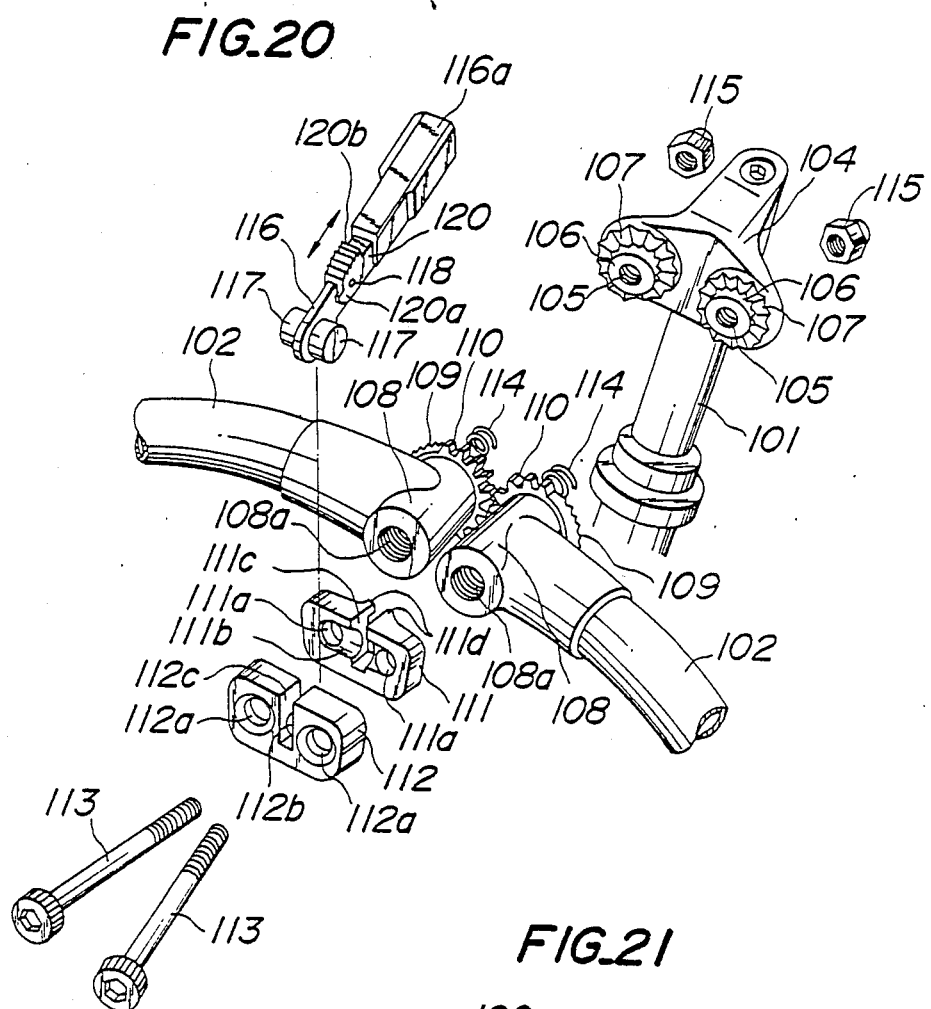
FIG. 20 is an exploded perspective view of the adjustable handlebar shown in FIG. 19.
Figure 23:
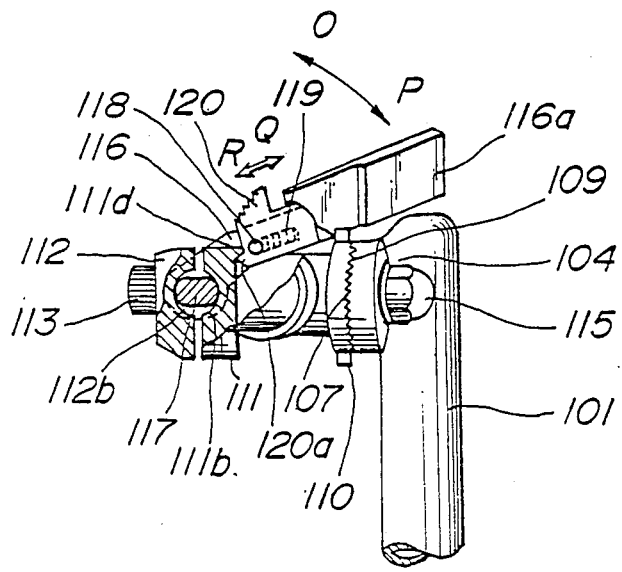
FIG. 23 is a partially sectional side view of a part of the handlebar shown in FIG. 19.
Figure 24:
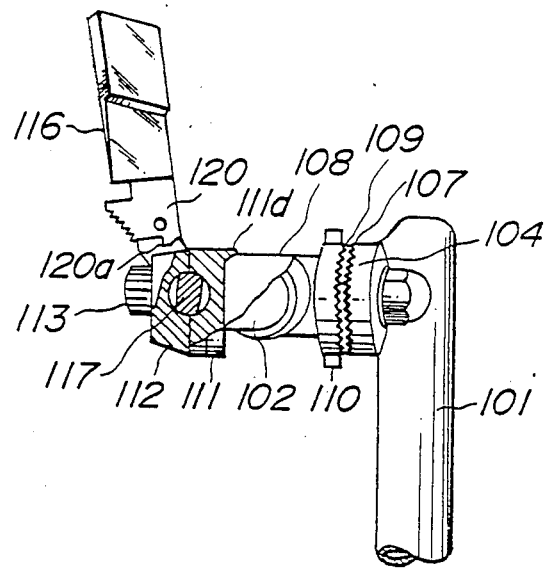
FIG. 24 is an explanatory view illustrating the part of the handlebar shown in FIG. 23.

After the coil spring 119 has been arranged in the slot 116c of the cam lever 116 and the lever lock 120 has been mounted on the main body of the lever 116, the pin 118 is inserted into the aperture 120c and the front part of the slot 116c of the lever 116 to combine the lever 116 with the lever lock 120 (FIGS. 20 and 23). In this case, the cams 117 of the lever 116 are located in the cam fitting grooves 111b in FIGS. 22 and 23 so that the lever 116 is pivotally raised and depressed as shown by a double-headed arrow OP in FIG. 23.

The handlebar of the fourth embodiment of the invention operates as follows.

Figure 19:
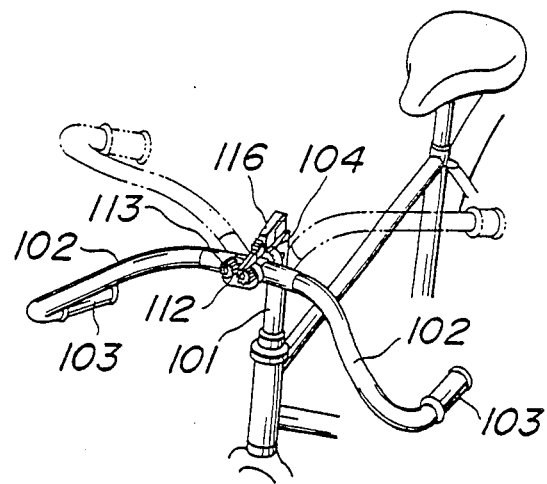
FIG. 19 is a perspective view of a fourth embodiment of the adjustable handlebar according to the invention.

FIGS. 19, 22 and 23 illustrate the handlebar members 102 clamped by depressing the lever 116. Under such a clamped condition, the cams 117 urge through the cam holder 111 the bosses 108 against the handlebar support member 104 so as to make the thrust serrations 109 and 107 in complete engagement with each other, so that the handlebar members 102 are firmly clamped without moving in front and rear directions and without rotatively moving relative to the bolts 113. The clamped degree of the handlebar members is freely adjustable depending upon the degree of tightening of the bolts 113.

According to this embodiment, as the pawls 120a of the lever lock 120 engage the projections 111d, the lever 116 does not move or rise in the direction O shown by the arrow in FIG. 23 unless the lever lock 120 is intentionally operated. Accordingly, even if the cyclist erroneously touch the lever 116 in riding the bicycle, the lever 116 is not moved and therefore the handlebar members are not unlocked. The safety of the bicycle cam, therefore, be more improved in this embodiment.

When it is desired to change the positions of the handlebar members 202, the lever lock 120 is moved or retracted in the direction Q shown by the arrow in FIG. 23 by retracting its stairs 120b by the fingers of the cyclist so as to disengage the pawls 120a from the projections 111d of the cam holder 111 and the lever 116 is raised in the direction O shown by the arrow in FIG. 23. In this manner, the cams 117 are rotated together with the lever 116 from the condition shown in FIG. 23 to that of FIG. 24. In the condition shown in FIG. 24, the bosses 108 have been moved in the front direction together with the cam holder 111 with the aid of the springs 114, so that the thrust serrations 107 and 109 are disengaged. Under such a condition, therefore, the handlebar members 102 can be pivotally moved in an upward or downward direction by moving only one of the handlebar members 102 because of the gear teeth 110 of the bosses 108 in mesh with each other. Accordingly, the operation of only one of the handlebar members symmetrically move both the handlebar members 102. When the handlebar members 102 assume desired positions, the lever 116 is depressed in the direction P shown by the arrow in FIG. 23 into its original position so as to rotate the cams 117 together with the lever 116 to bring the thrust serrations into engagement with each other as shown in FIGS. 22 and 23, thereby securely clamping the handlebar members 102.

During the movement of the lever 116 in the direction P shown by the arrow is FIG. 23, inclined surfaces on undersides of the pawls 120a of the lever lock 120 engage the projections 111d of the cam holder 111. A further movement of the lever 116 in the direction P causes the lever lock 120 together with the pin 118 to move in the direction Q shown by the arrow in FIG. 23 compressing the coil spring 119. During such a movement of the lever 116, when the pawl 120a is further moved beyond the projections 111d, the lever lock 120 tends to return in the direction R shown by the arrow in FIG. 23 by the action of the spring 119, so that the pawls 120a engage the projections 111d to prevent the lever 116 from returning into the direction O shown by the arrow in FIG. 23.

Figure 25A:
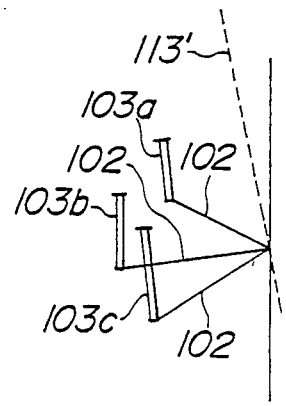
FIGS. 25a, 25b and 25c illustrate grip positions of the handlebar of the fourth embodiment of the invention shown in FIG. 19.
Figure 25B:
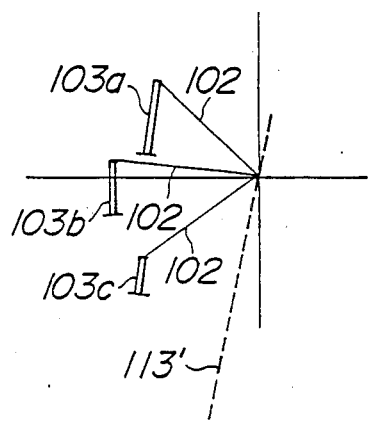
Figure 25C:
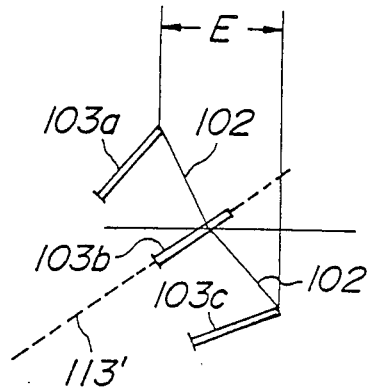

FIGS. 25a–25c illustrate positions 103a, 103b and 103c of the grips 103 of the handlebar of the fourth embodiment in raised, horizontal and lowered positions, where dash lines 113' denote axes of the bolts 113 crossing with each other. FIGS. 25a, 25b and 25c show the positions of the grip as viewed from above, front and side positions of the bicycle, respectively.

According to the fourth embodiment, as above described, the axes 113' of the bolts 113 are not in parallel with each other and adapted to cross with each other in front of the bicycle. As can be seen from FIG. 25c, therefore, an angle of elevation of the grip 103a in the raised position is larger than that in the horizontal position and an angle of elevation of the grip 103c in the lowered position is smaller than that in the horizontal position. Accordingly, the grip 103c is in the forward lowered position at the near horizontal or slight angle of elevation corresponding to the line c shown in FIG. 1. This is advantageous because the cyclist assumes the forwardly inclined position as shown in the solid lines A when riding at high speeds. On the other hand, the grip 103a is in the raised position retracted by E at the large angle of elevation corresponding to the line F shown in FIG. 1. Accordingly, this position reduces loads acting upon wrists of the cyclist because he assumes the comfortable position with the upper part of his body being upright when riding at usual or lower speeds.

As can be seen from FIG. 25a, moreover, distances between the grips 103a in the raised position and between the grips 103c in the lowered position are smaller than that between the grips 103b in the horizontal position, but the grips 103a and 103b extend rearward outwardly to compensate for the narrowed distances between the grips.

As above described, the bicycle according to the invention is capable of simply changing its handlebar into a lowered, raised or horizontal position and easily and securely setting the grip angles which are the most convenient for riding and braking operation according to a physique of a cyclist.

The handlebar according to the invention is simple in construction and hence easy to manufacture. The change of the handlebar position is very simply and quickly effected only by raising and lowering the single lever and moving one of the handlebar members. By depressing the lever the handlebar is securely fixed against rotation and axial movement relative to the studs with the aid of the automatically operating lever lock mechanism to improve the safety of bicycle riding.

It is further understood by those skilled in the art that the foregoing description is that of preferred embodiments of the disclosed handlebar and that various changes and modifications may be made in the invention without departing from the spirit and scope thereof.

What is claimed is:

1. An adjustable handlebar for a bicycle, comprising two handlebar members whose adjacent ends are pivotally supported by two fasteners extending from an upper portion of a handlebar stem, gear teeth formed on said adjacent ends of the handlebar members and in mesh with each other such that when one of said handlebar members is pivotally moved about one of said fasteners, the other handlebar member is also pivotally moved about the other fastener, anchoring means provided between engaging surfaces of said upper portion of said handlebar stem and of said adjacent ends of said handlebar members for anchoring said handlebar members, and a cam and cam follower assembly having a lever for engaging and disengaging said anchoring means, said cam and cam follower assembly comprising a cam holder adjacent to and in front of said adjacent ends of said handlebar members, and a retainer plate adjacent to and in front of said cam holder, said cam holder and retainer plate including opposed recesses to form in their adjacent portions a cam fitting cylindrical space, said fasteners passing through said cam holder and said retainer plate so as to permit said holder and plate to slide thereon when the fasteners are loosened, and a cam lever formed at one end with ellipsoid-shaped cams extending in lateral directions and received in said cam fitting cylindrical space to move said cam holder away from said retainer plate when said ellipsoid-shaped cams are rotated in said cylindrical space by moving said cam lever.

2. An adjustable handlebar as set forth in claim 1, wherein said cam lever further comprises a lever lock slidably movable on a main body of said cam lever and always springly urged in the front direction and provided at its front end with at least one pawl engageable with a projection of said cam holder, thereby preventing the cam lever from being moved until said lever lock is retracted against the springly urged action.

3. An adjustable handlebar as set forth in claim 2, wherein said cam lever is further formed on the other end with a grip and a clearance between a front portion of said grip and said main body of said cam lever, said lever lock is formed in a U-shaped cross-section so as to be fitted on said main body of said cam lever such that a rear part of said lever lock is inserted in said clearance and legs of said U-shaped lever lock embrace said main body of said cam lever, and said cam lever further comprises a coil spring received in a slot formed in said main body of said cam lever and a pin slidably received in said slot formed in said main body and retained with its ends in apertures formed in said legs of said U-shaped lever lock so as to urge said U-shaped lever lock in the front direction by said coil spring.

4. An adjustable handlebar as set forth in claim 3, wherein said lever lock is further formed with a latch with which a cyclist retracts said lever lock by fingers.

5. An adjustable handlebar as set forth in claim 4, wherein said latch is formed like stairs inclined as a whole.

6. An adjustable handlebar as set forth in claim 3, wherein said pawl is formed on its underside with an inclined surface which engages said projection of said cam holder so as to permit said pawl to move beyond said projection of said cam holder during moving said cam lever, thereby enabling said cam lever to be in a locked position without manually retracting said lever lock.

7. An adjustable handlebar as set forth in claim 1, wherein extensions of axes of said fasteners cross in front of the bicycle.

8. An adjustable handlebar for a bicycle, comprising two handlebar members whose adjacent ends are pivotally supported by two bolts threadedly engaged in screw-threaded apertures formed in an upper portion of a handlebar stem, extensions of axes of said bolts crossing in front of the bicycle, gear teeth formed on said adjacent ends of the handlebar members and in mesh with each other such that when one of said handlebar members is pivotally moved about one of said bolts, the other handlebar member is also pivotally moved about the other bolt, two sets of thrust serrations in opposition to each other and respectively formed on engaging surfaces of said handlebar stem and said handlebar members, said serrations having radial crests, isosceles triangle-shaped in section and positioned concentrically to said bolts, coil springs arranged about said bolts and received in spaces formed in said adjacent ends of said handlebar members along said bolts to urge said adjacent ends of the handlebar members away from said upper portion of said handlebar stem, thereby positively disengaging said serrations when said bolts are loosened, a cam holder adjacent to and in front of said adjacent ends of said handlebar members, a retainer plate adjacent to and in front of said cam holder said cam holder and retainer plate including opposed recesses to form in their adjacent portions a cam fitting cylindrical space, said bolts passing through said cam holder and said retainer plate so as to permit said cam holder and said retainer plate to slide thereon when the bolts are loosened, and a cam lever formed at one end with ellipsoid-shaped cams extending in lateral directions and received in said cam fitting cylindrical space to move said cam holder away from said retainer plate when said ellipsoid-shaped cams are rotated in said cylindrical space by moving said cam lever, and said cam lever further comprising a lever lock slidably movable on a main body of said cam lever and always springly urged in the front direction and provided at its front end with at least one pawl engageable with a projection of said cam holder, thereby preventing the cam lever from being moved until said lever lock is retracted against the springly urged action.

* * * * *

UNITED STATES PATENT AND TRADEMARK OFFICE
CERTIFICATE OF CORRECTION

PATENT NO.  : 4,682,509

DATED       : July 28, 1987

INVENTOR(S) : K. TAKAMIYA et al.

It is certified that error appears in the above-identified patent and that said Letters Patent is hereby corrected as shown below:

Title page:

Under Section [30],  change "58-66356" to --57-66356--;
                     change "58-66357" to --57-66357--;
                     change "58-88771" to --57-88771--;
                     change "59-32923" to --58-32923--.

Signed and Sealed this

Fifteenth Day of November, 1988

Attest:

DONALD J. QUIGG

*Attesting Officer*           *Commissioner of Patents and Trademarks*